May 31, 1966  S. G. HARRIS  3,253,299
METHOD FOR PREPARING CRAB BODIES FOR THE RECOVERY
OF MEAT THEREFROM
Filed June 25, 1964  10 Sheets-Sheet 1

INVENTOR.
Sterling G. Harris
BY
Pennie Edmonds Morton
Taylor Adams
Attorneys

May 31, 1966  S. G. HARRIS  3,253,299
METHOD FOR PREPARING CRAB BODIES FOR THE RECOVERY
OF MEAT THEREFROM
Filed June 25, 1964  10 Sheets-Sheet 2

INVENTOR.
Sterling G. Harris
BY
Pennie Edmonds Morton Taylor Adams
Attorneys

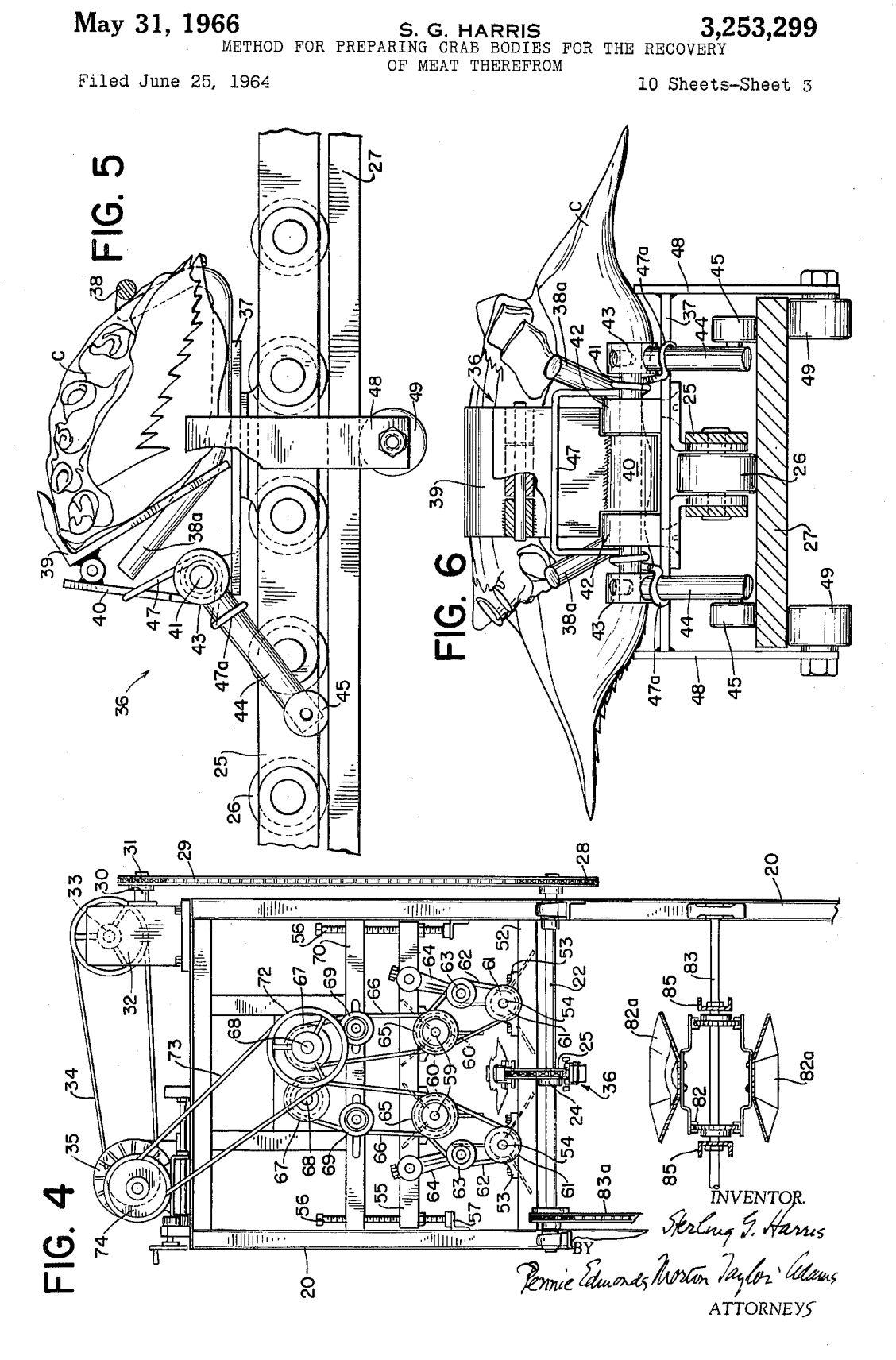

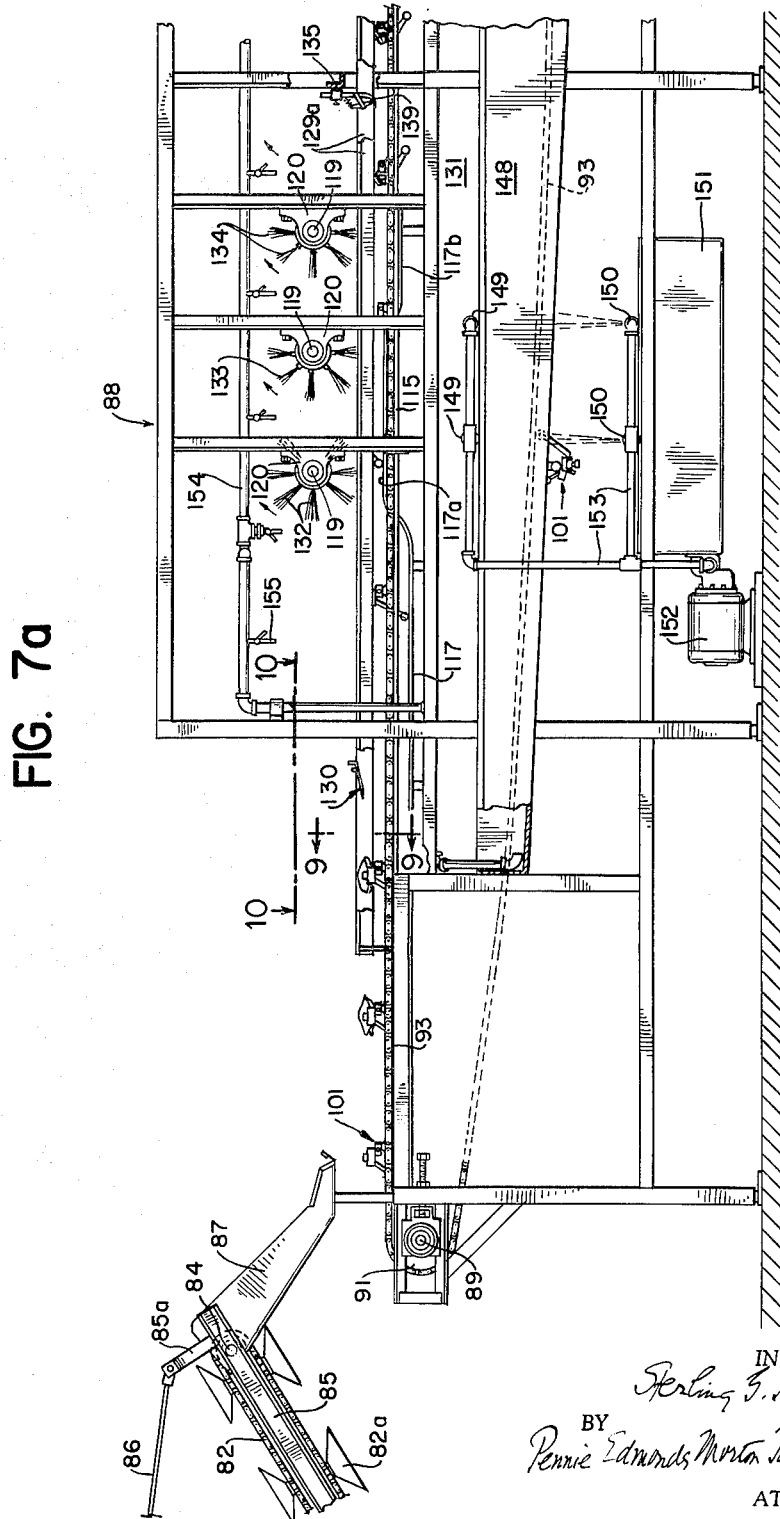

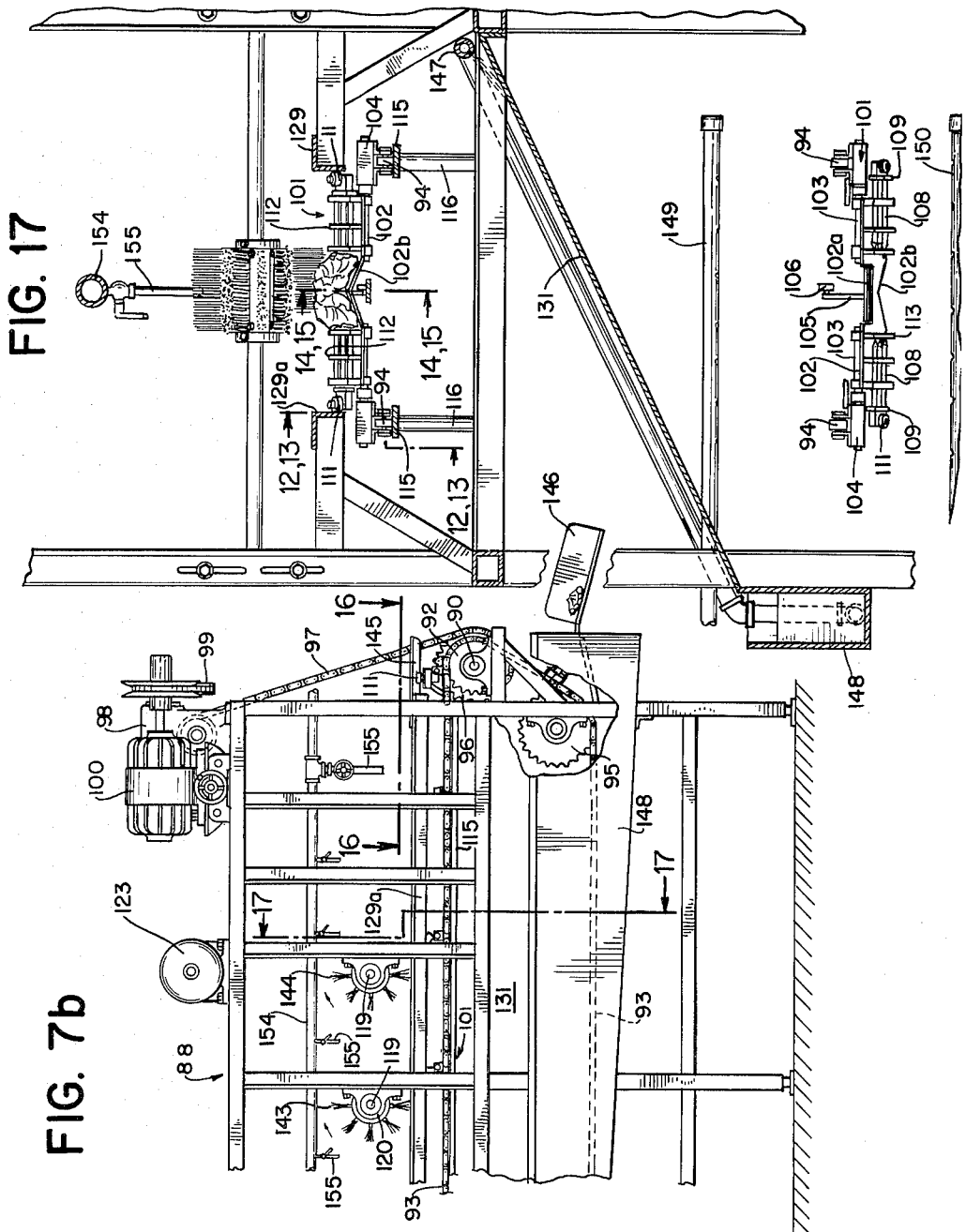

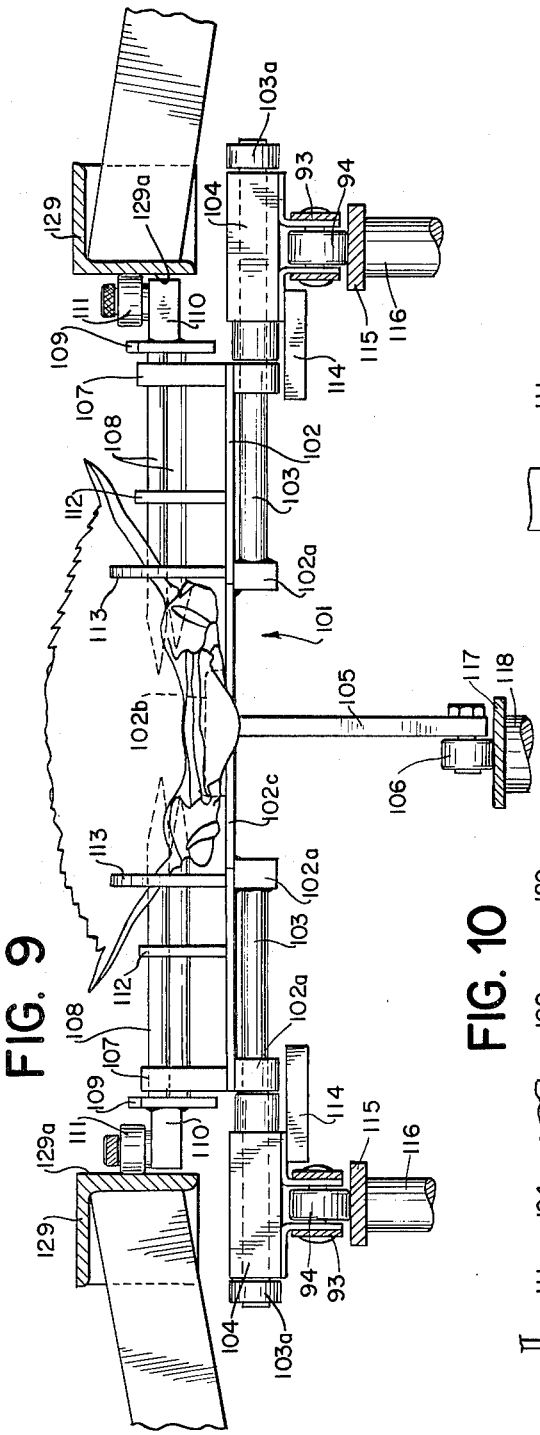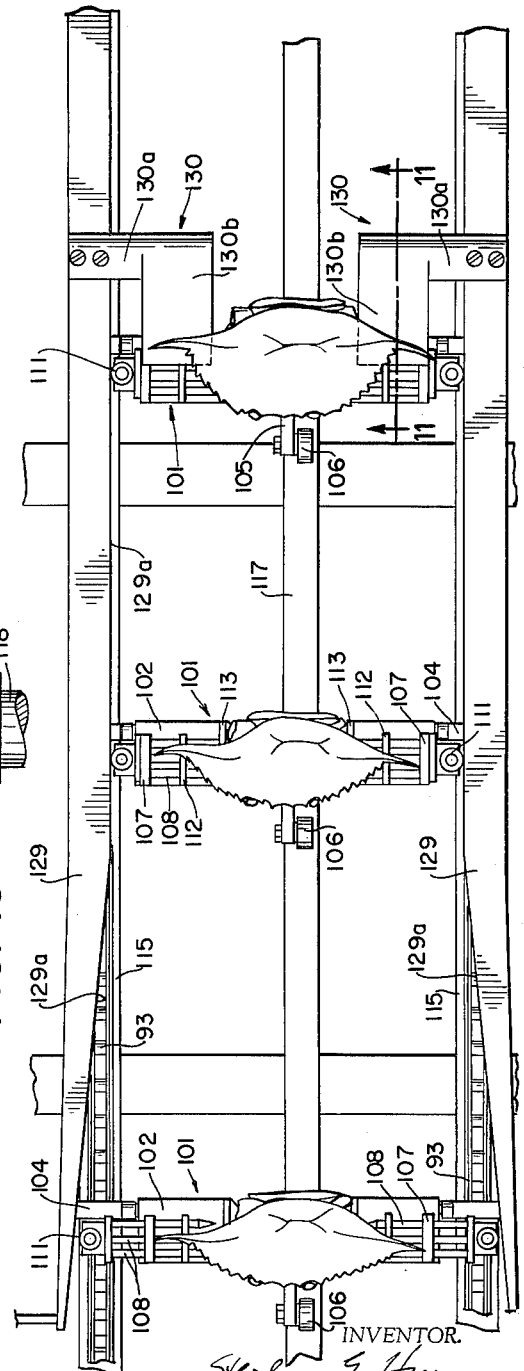

May 31, 1966  S. G. HARRIS  3,253,299
METHOD FOR PREPARING CRAB BODIES FOR THE RECOVERY
OF MEAT THEREFROM
Filed June 25, 1964  10 Sheets-Sheet 8

INVENTOR.
Sterling G. Harris
BY
Pennie Edmonds Morton Taylor & Adams
Attorneys

May 31, 1966 S. G. HARRIS 3,253,299
METHOD FOR PREPARING CRAB BODIES FOR THE RECOVERY OF MEAT THEREFROM
Filed June 25, 1964 10 Sheets-Sheet 9

INVENTOR.
Sterling G. Harris
BY
Pennie Edmonds Morton Taylor-Adams
Attorneys

FIG. 15
FIG. 16
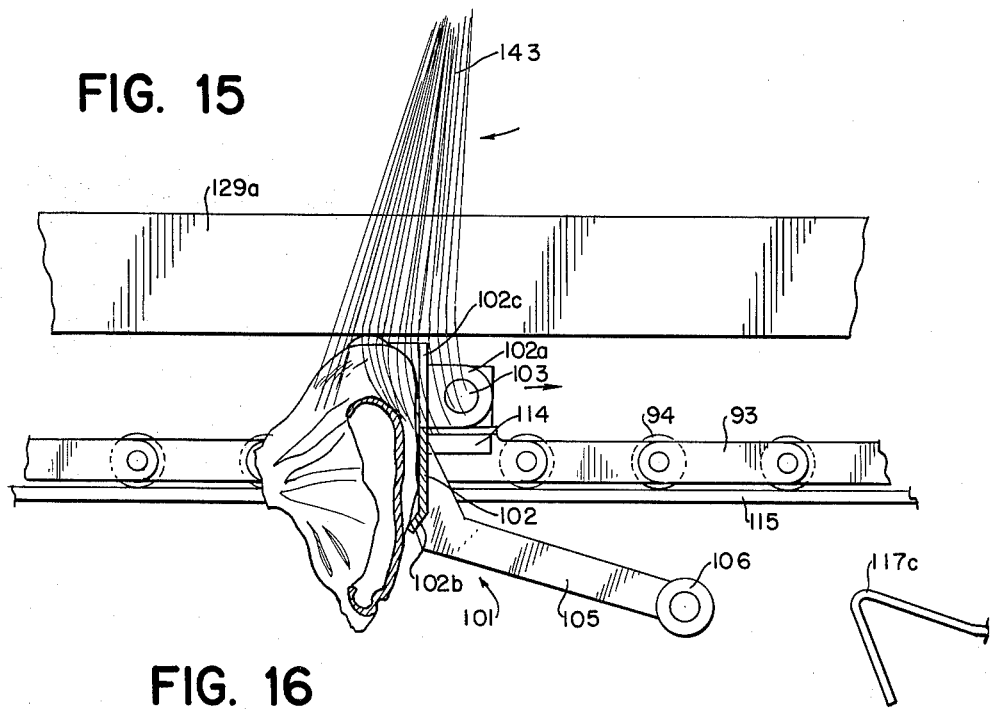
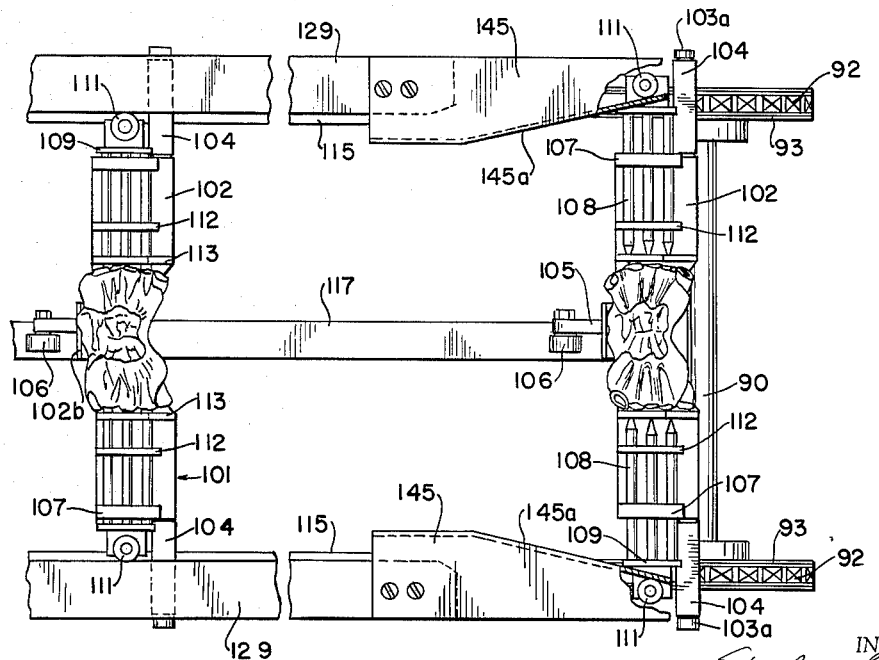

United States Patent Office 3,253,299
Patented May 31, 1966

3,253,299
METHOD FOR PREPARING CRAB BODIES FOR THE RECOVERY OF MEAT THEREFROM
Sterling G. Harris, Beaufort, S.C., assignor to The Blue Channel Corporation, Port Royal, S.C., a corporation of Maryland
Filed June 25, 1964, Ser. No. 377,831
15 Claims. (Cl. 17—45)

This invention relates to the recovery of meat from crabs, such as the common edible crabs of the Atlantic coasts of North and South America. The Atlantic crabs referred to include the blue, rock, sand, and other species and the invention may also be utilized in the treatment of the Dungeness crabs of the Pacific coasts of the United States and Canada and crab species found in the North Sea of Europe and elsewhere and having body, leg, and claw conformations similar to those of the blue crab. More particularly, the invention is concerned with a novel method of preparing cooked crabs for recovery of the meat therefrom by the practice of the method of my Patent 2,858,223, issued October 28, 1958, and with an apparatus by which the method of preparation can be advantageously practiced.

The method of Patent 2,858,223 can be employed for recovering the meat from the bodies of fish or crabs and, when it is used in the treatment of crabs, the crabs are first cooked and, thereafter, in a preliminary operation, the legs and claws are detached. The carapace, gills, mouth parts, apron, and visceral matter are then removed in successive operations and the stripped carcasses are ready to be subjected to the steps of the patented method. Heretofore, the preparation of the stripped crab carcasses for subsequent treatment has been carried out by hand and the cost of the numerous manual operations required has contributed substantially to the cost of the crab meat in suitable condition for packing as fresh crab meat, for canning, for shipment in pasteurized or frozen condition, or for use in combination with other ingredients in various food products.

The present invention is, accordingly, directed to the provision of a method for transforming cooked whole crabs into stripped carcasses, which can be carried on mechanically with little manual intervention, and with an apparatus, by which the new method can be advantageously practiced. In the treatment of crabs in accordance with the method, they are first advanced along a path with the bodies of the crabs held with the axes of the bodies extending lengthwise of the path. During the movement of a body, the legs and claws thereon are repeatedly struck and flexed, until they are broken off at the knuckles by which they are attached to the body, and released. Each crab body is then placed, either manually or by mechanical means, in a traveling holder and held in place therein with the axis of the body extending in the direction of movement of the holder by means engaging the body in or adjacent to the leg and claw openings. During the advance of the holder with the crab body thereon, the carapace is freed from the body to expose the main visceral cavity and, in successive operations, the gills are removed, the mouth parts are broken off, the apron torn free, any waste material exposed by or resulting from detachment of the apron is cleared away, the fat and visceral material is removed, and the interior cavity flushed with water. At the completion of the operations, the stripped carcasses, which are ready for treatment in accordance with the method of Patent 2,858,223, are successively discharged from their holders and the holders are returned to their original position to be reloaded.

For a better understanding of the invention, reference may be made to the accompanying drawings, in which FIG. 1 is a view in side elevation with parts broken away of a form of apparatus for performing the initial steps in the method for the removal of the legs and claws from the crabs;

FIG. 4 is a view in rear end elevation of the apparatus of FIG. 1 showing the drive for the apparatus;

FIG. 5 is a view in side elevation on an enlarged scale of part of the conveyor with a clamp for holding the body of a crab while the legs and claws are being detached;

FIG. 6 is a transverse sectional view through the conveyor shown in FIG. 5;

FIG. 7a is a partial side elevational view of an apparatus for practicing the remaining steps on the new method;

FIG. 7b is a partial side elevational view of the remainder of the apparatus shown in FIG. 7a;

Figure 11:
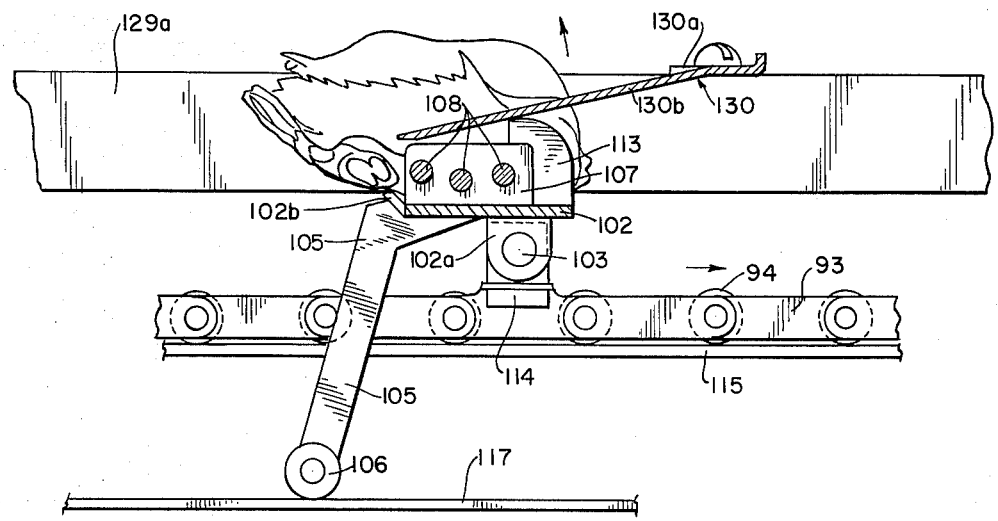
Figure 12:
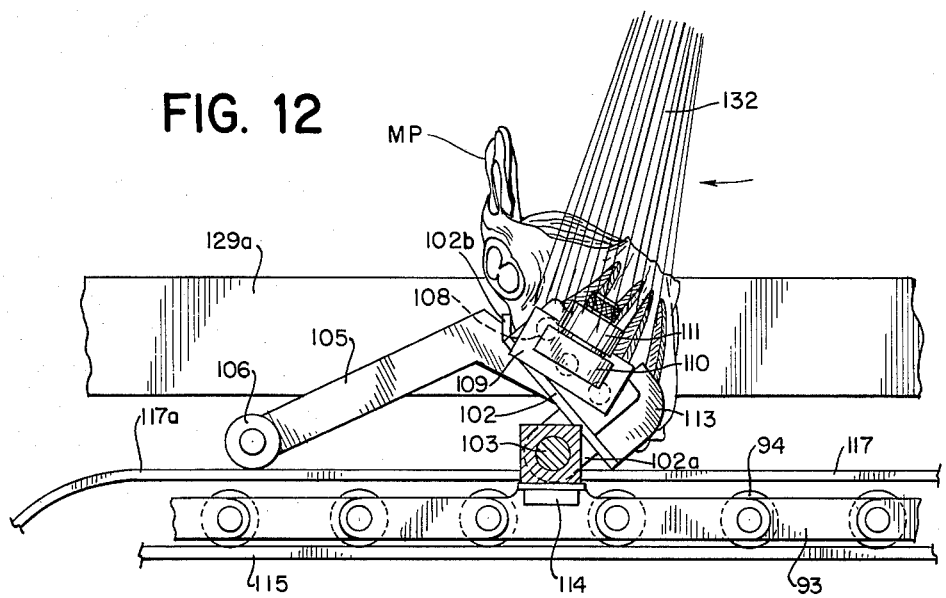

FIGS. 9 and 10 are sectional views on the lines 9—9 and 10—10, respectively, of FIG. 7a;

FIG. 11 is a sectional view on the line 11—11 of FIG. 10;

FIGS. 12, 13, 14, and 15 are sectional views on the lines 12—12, 13—13, 14—14, and 15—15, respectively, of FIG. 17, showing the performance of different steps in the method; and FIGS. 16 and 17 are sectional views on the lines 16—16 and 17—17, respectively, of FIG. 7b.

The crabs to be processed in accordance with the new method by means of the apparatus shown in the drawings are preliminarily cooked in conventional steam retorts or boxes or in boiling water, the cooking conditions depending on the condition and weight of the crabs with the fatter and heavier crabs requiring more severe treatment. Cooking times and temperatures for steam cooking typical crabs may vary widely and the time may range from 15 to 30 minutes at 212° F. to 5 to 15 minutes with the temperatures ranging between 240° and 250° F. When the crabs are boiled, the boiling time ranges from 15 minutes up.

Figure 1:
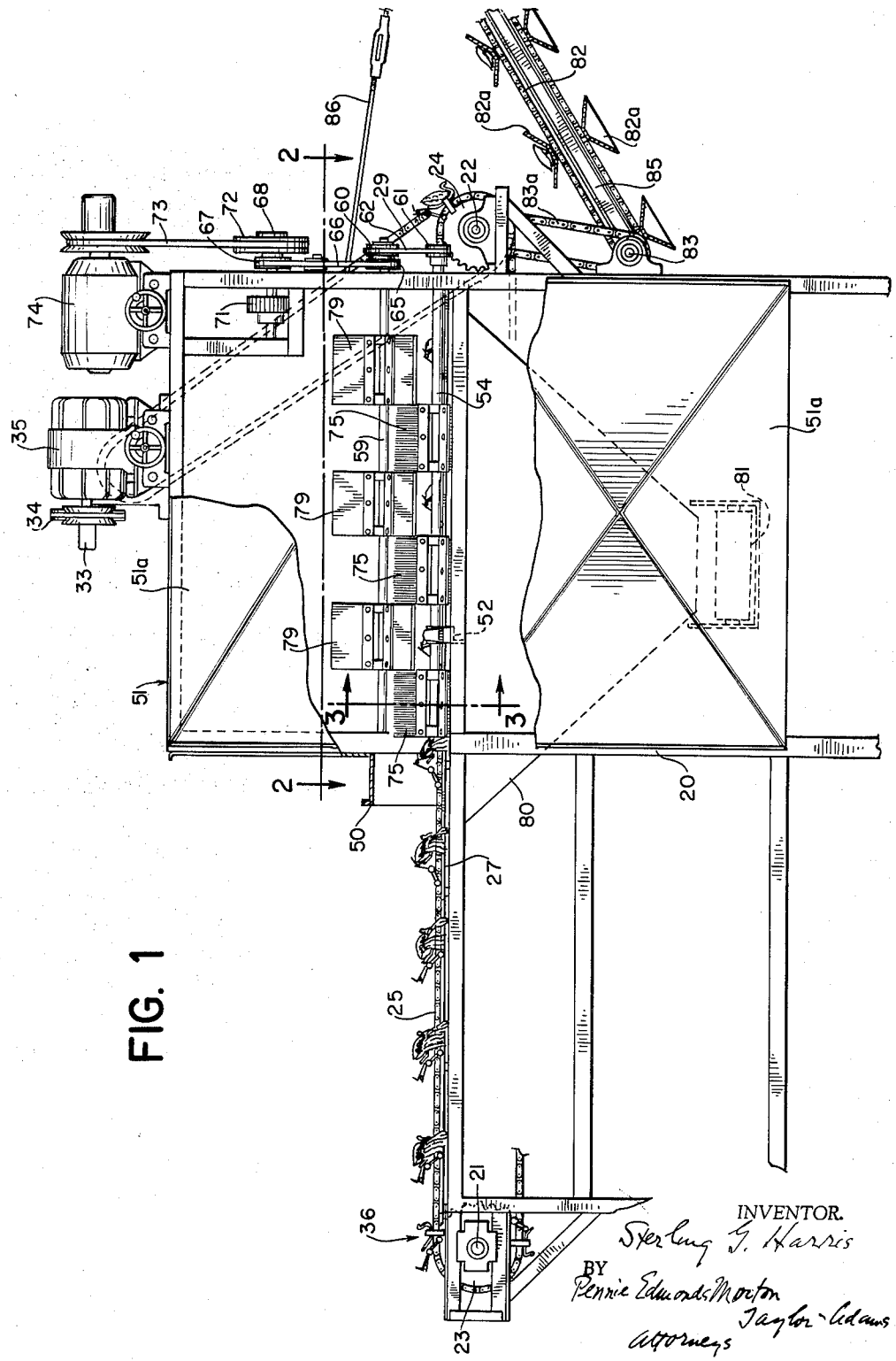
Figure 2:
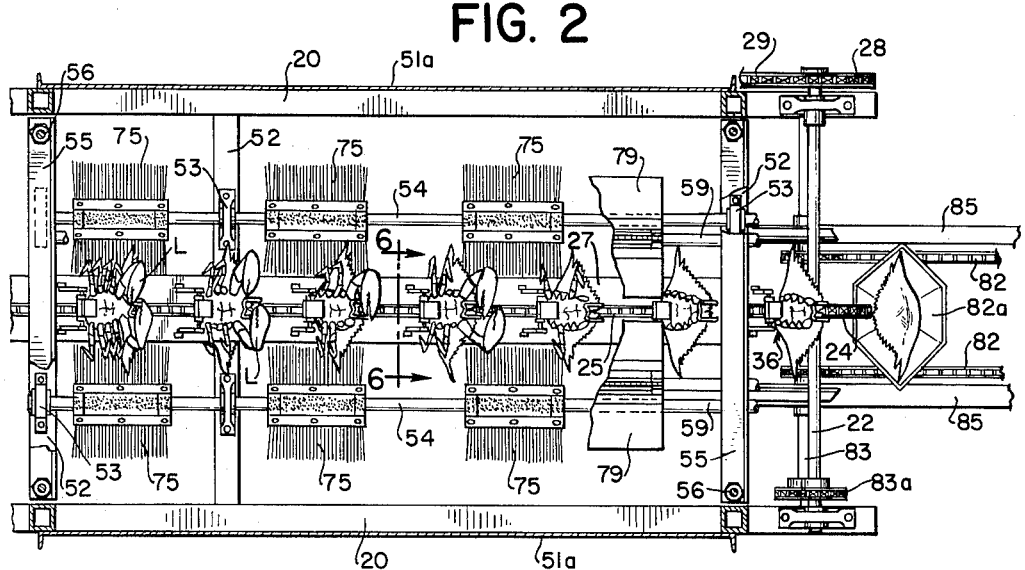
FIG. 2 is a sectional view on the line 2—2 of FIG. 1 with parts broken away.

The first steps of the method are performed in the apparatus of FIG. 1, to which cooked crabs are delivered at the left-hand end. The apparatus includes a framework 20, which is preferably made of stainless steel tubing square in section and at opposite ends of which shafts 21 and 22 are mounted in suitable bearings. Sprocket wheels 23, 24 on the shafts drive a conveyor chain 25 having rollers 26 (FIGS. 5, 6) and the rollers in the upper stretch of the chain run on a track 27 mounted on and extending the length of the framework. The track is narrow for the minor part of its length starting at the left in FIG. 1 and the rest of the track is wide. A sprocket wheel 28 (FIG. 2) on shaft 22 is connected by a chain 29 to a sprocket wheel 30 on the output shaft 31 (FIG. 4) of a speed reducer 32 having an input shaft 33 driven through a belt 34 by a motor 35 mounted on top of the framework.

Clamps 36 are mounted at intervals along the chain 25 and each clamp includes a fixed jaw formed of a plate 37 secured to ears extending laterally from the links of the chain and a stirrup 38 mounted on top of the plate. The stirrup is formed of a rod of U-shape with its bight at the forward end of the plate and extending upwardly from the plate and rearwardly and its legs 38a extending upwardly at an angle to the plate. The fixed jaw provides a seat for a crab with the stirrup acting as an abutment engaged by one end of the crab. The other jaw of each clamp is movable and is formed of an L-shaped plate 39 pivoted near one end of a plate 40 having its other end loosely encircling a shaft 41 mounted in lugs 42 secured to the plate 37 near its rear edge. When the clamp is in use, the plate 40 extends upwardly from the plate 37 and the long leg of the jaw 39 extends downwardly from its attachment to the plate 40 with its lower edge resting on top of the plate 37. The short leg of the jaw 39 extends forwardly from the long leg at the upper end thereof and the legs at their junction form an abutment for the other end of the crab. A collar 43 having an arm 44 extending radially therefrom is mounted rigidly on each end of the shaft 41 and a roller 45 is pivotally mounted on each arm 44 near its lower end. The rollers do not engage the narrow part of the track 27 but run up on and travel along the wide part. A U-shaped spring 47 has a bight extending across the rear face of the plate 40 and each leg of the spring is formed with a convolution encircling the shaft 41 and an end section 47a partially encircling one of the arms 44. The plate 37 is provided with side plates 48 which carry rollers 49 underlying the edges of the wide part of the track 27.

Figure 3:
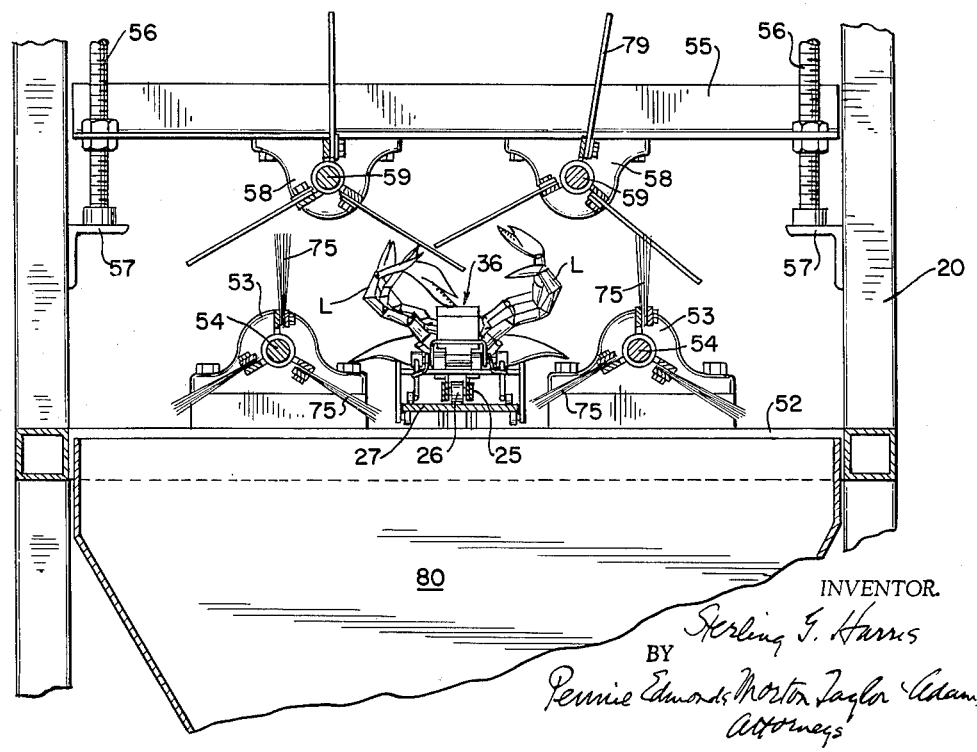
FIG. 3 is a sectional view on the line 3—3 of FIG. 1.

Beyond the front end of the wide part of the track 27, the upper stretch of the chain 25 passes through a hood 50 into a housing 51 formed by metal sheets 51a attached to the framework 20. Within the housing, the framework includes lower crosspieces 52 (FIGS. 2, 3), on which are mounted bearings 53 supporting a pair of parallel shafts 54 on opposite sides of the chain. Upper crosspieces 55 are mounted in the housing on adjusting screws 56 supported on brackets 57 attached to the framework and carry bearings 58 for a pair of parallel shafts 59 on opposite sides of the chain. At the rear ends (FIG. 4), the shafts 59 carry pulleys 60 connected to pulleys 61 on the shafts 54 by timing belts 62, which are kept taut by idler pulleys 63 on arms 64 secured for angular adjustment on the upper crosspiece 55 at the rear end of the machine. Shafts 59 also carry pulleys 65 connected by timing belts 66 to pulleys 67 on shafts 68, the belts being kept taut by idler pulleys 69 on an upper crosspiece 70 mounted on the adjustment screws 56. If desired, the timing belts 62 and 66 may be replaced by chains, in which event pulleys 60, 61, 63, 65, 67, and 69 are replaced by sprocket wheels. The shafts 68 are mounted in suitable bearings on the framework and are connected together by meshing gears 71 (FIG. 1). One of the shafts 68 carries a grooved pulley 72 connected by a belt 73 to a motor 74 on the top of the framework.

Just inside the housing 51, each lower shaft 54 carries a group of beaters 75, which are preferably brushes with stiff bristles formed of a suitable synthetic plastic material. There are three brushes 75 in each group and the beaters are spaced at equal angles about the shaft. The shafts are rotated in such direction that the brushes travel upwardly on each side of the conveyor chain 25 and lift the legs and claws L of crabs held in clamps on the chain. In their movement, the brushes strike the points of the carapace of the crabs but the bristles separate and are thus not damaged by their contact with the carapace.

Immediately beyond the groups of brushes 75 on the shafts 54, each shaft 59 carries a group of beaters 79 which are mounted in groups on the shafts in the same way as the brushes and are made of a suitable material, such as a flexible but relatively stiff synthetic plastic sheet material. In the machine shown, there are three beaters 79 in each group and the radial length of the individual beaters is such that, as the shafts 59 rotate, the beaters on the shafts pass over the top of the carapace of the crabs held in the clamps on the conveyor chain but strike the legs and claws L raised by the brushes 75.

The shafts 54 carry a number of spaced groups of brushes 75 and, in the apparatus illustrated, there are three groups of brushes on each shaft and each shaft 59 carries a like number of groups of sheet beaters 79. The brushes in corresponding groups on shafts 54 are aligned as are also the beaters on shafts 59 and the groups of brushes 75 on shafts 54 are staggered in relation to the groups of beaters 79 on shafts 59.

As each clamp 36 on the conveyor chain 25 enters the upper stretch of the chain, the rollers 45 on the arms 44, which operate the spring 47 of the clamp, are not in contact with the track 27 and the arms 44 swing downwardly and cause the plate 40 to swing away from the stirrup 38 and move the jaw 39 along the plate. As a result, the clamps on the chain between the sprocket wheel 23 and the left-hand end (FIG. 1) of the wide part of the track are fully open. A crab is placed in the stirrup of each open clamp with its carapace down and the mouth end of the crab in contact with the leading end of the stirrup. When the arms 44 strike the end of the wide part of the track, they are swung and the rollers 45 on the arms 44 ride up on the track. The movement of the arms flexes the spring, so that it rocks the plate 40 toward the stirrup and this causes the long leg of the jaw 39 to slide along the plate 37. The short leg of the jaw overhangs the rear edge of the crab and, as the movement of the jaw continues, the front and rear edges of the crab are seated firmly against the abutments provided by the stirrup and the legs of the jaw 39 at their junction. In the sliding movement of the long leg of the jaw 39 along the plate 37, the junction of the legs of the jaw travels approximately in a plane, so that crabs of different sizes are held by the clamp in about the same angular relation to the plate 37. The result is that the knuckles of crabs in the clamps are at about the same elevation regardless of the size of the crabs and this facilitates removal of the legs and claws.

During the travel of the crab through the housing, the legs and claws are repeatedly struck, first by the brush beaters on the lower shafts and then by the sheet beaters on the upper shafts, with the two types of beater acting in alternation. The repeated flexing of the legs and claws breaks them loose at the knuckles and, at some stage in the travel of a crab through the housing, its legs and claws are torn free and drop into a pan 80 mounted on the framework of the housing and having a discharge opening over a conveyor belt 81 which carries the legs and claws away from the housing. As the rollers 45 of the clamps leave the track 27 at the outlet end of the housing, the upper jaws 39 of the clamps are released but the crabs remain in the stirrups until the clamps are carried by the chain 25 part way around the sprocket wheel 24. The crabs then fall out of the stirrups to land in cups 82a on a conveyor including chains 82 trained about sprocket wheels on a shaft 83 on the framework 20 and driven through a chain 83a from shaft 22 and about sprocket wheels on a shaft 84 in a frame 85 pivoted on the shaft 83. At its end remote from the framework 20 (FIG. 7a), the frame 85 has a yoke 85a connected to the framework by a connection 86 adjustable in length to raise and lower the frame and the conveyor. The chains 25 and 82 are so timed that each crab body released by a clamp 36 drops into a cup 82a and, as the cups pass around the shaft 84, the crabs carried thereby fall into a pan 87.

The remaining operations of the method are performed in the apparatus shown in FIGS. 7a and 7b. Such apparatus includes a framework 88 of stainless steel square tubing which is closed by metal sheets to form a housing and at opposite ends of which shafts 89, 90 are mounted in suitable bearings, the bearings for shaft 89 being adjustable. A pair of sprocket wheels 91 are mounted on shaft 89 and shaft 90 carries similar sprocket wheels 92. A pair of conveyor chains 93 with rollers 94 are trained about aligned sprocket wheels on the two shafts and the lower stretch of each chain is guided by an idler sprocket wheel 95 on a shaft in bearings on the framework. The chains are kept taut by adjustment of the bearings for shaft 89. The shaft 90 carries a sprocket wheel 96 driven through a chain 97 by a speed reducer 98, which is driven through a belt 99 by a motor 100 on the top of the framework.

Holders 101 for crab bodies are mounted at intervals on the chains 93 and each holder (FIGS. 9, 10) includes a base plate 102 lying between the chains and connected rigidly to aligned shafts 103 by ears 102a extending downwardly from the plate near its forward edge and encircling the shafts. Each shaft 103 is mounted in a bearing block 104 secured to laterally extending ears on links of a chain 93 and the shafts are held in place by collars 103a at their outer ends. An arm 105 is secured to the under surface of the plate 102 near its rear edge midway between its ends and carries a roller 106 at its lower end. A pair of side plates 107 are mounted on top of the plate 102 along its side edges and each side plate has openings for three pins 108 extending inward from the side plate and having pointed inner ends. The pins of each set are secured to a vertical plate 109, which lies outwardly from a side plate 107 and has a block 110 carrying a stud, on which a roller 111 is mounted. Inward from the side plates, the pins of each set pass through openings in a pair of vertical guide plates 112 mounted on top of the plate 102. The inner guide plates of each pair are provided with upward extensions 113, which serve as stops for the rear end of a crab body to be held in the holder. The middle part 102b of the rear edge of the plate 102 is turned up (FIG. 11) and its forward edge is cut away to form a notch 102c. The plate 102 is movable about the common axis of shafts 103 and stop plates 114 for limiting the downward movement of the plate are mounted on the inner ears of the links of chains 93, to which the blocks 104 are attached.

The rollers 94 in the upper stretches of the chains 93 runs on tracks 115 on posts 116 attached to the framework and the rollers 106 of the holders run on a cam track 117 lying between the tracks 115 and mounted on posts 118 attached to the framework. The track 117 has portions at different levels and is interrupted in order to cause the holders to be tilted at various angles for purposes to be described.

Figure 8:
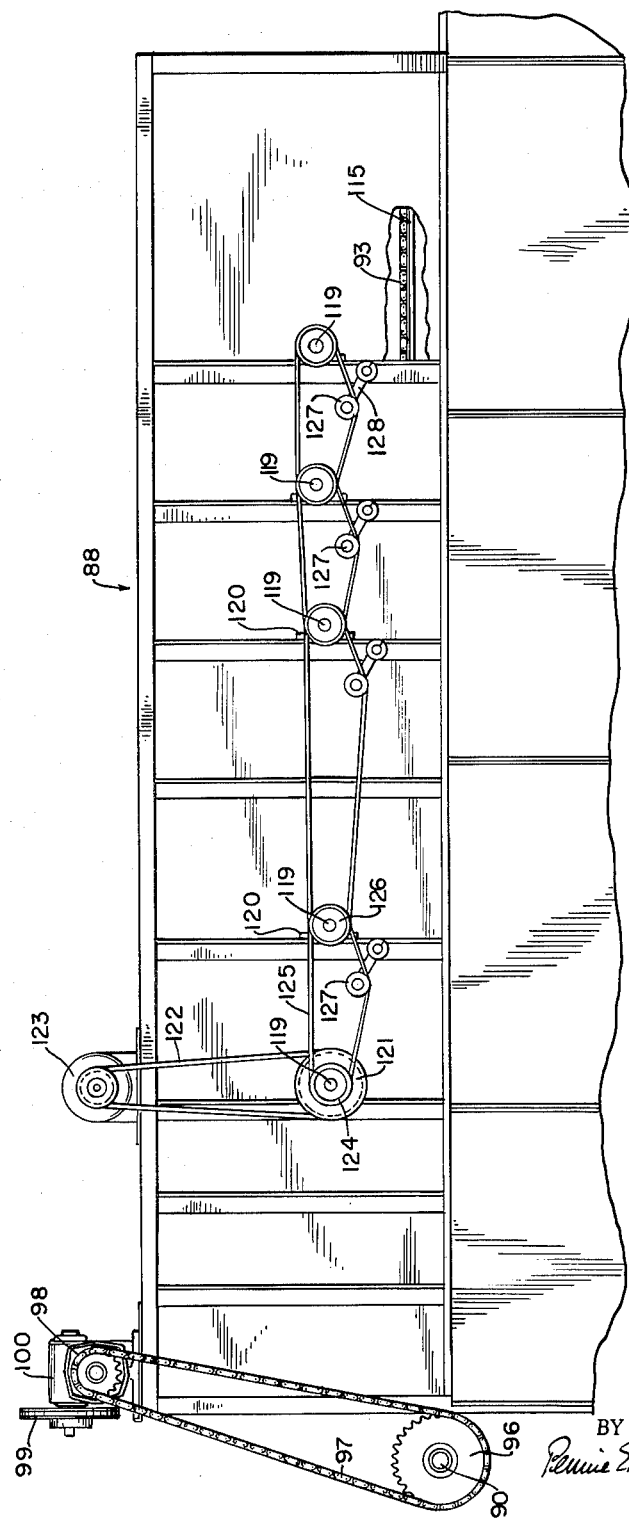
FIG. 8 is an elevational view showing the drive for the apparatus of FIGS. 7a and 7b.

A plurality of shafts 119 are mounted to extend across the framework 88 in bearings 120 attached to upright members of the framework. The shaft nearest the rear end of the housing carries a pulley 121 (FIG. 8) driven through a belt 122 by a motor 123 on the top of the framework. The shaft a second pulley 124 connected through a belt 125 to a pulley 126 on the next shaft 119 in the series and the belt is kept taut by a belt tightener pulley 127 on an arm 128 mounted for angular adjustment on the framework. In like manner, each of the shafts 119 is driven through a belt by the shaft at one side and drives the shaft at the other side through a belt and all of the belts have belt tighteners similar to that provided for the belt 125. The belts may be timing belts or V-belts or, if desired, they may be replaced by roller chains, in which case, the pulleys will be replaced by sprocket wheels.

A pair of cam tracks 129 (FIGS. 9, 10) are mounted on the framework 88 on opposite sides and above the level of the upper stretch of the chains 93 and the tracks have opposed vertical surfaces 129a, the left-hand ends of which converge in the direction of travel of the chains. When a holder passes out from under the chute 87, a crab body from the chute is placed on the plate 102 of the holder with the carapace up, its front end facing to the rear, and its apron end against the stops 113 and overlying the notch 102c. As the loaded holder is advanced between the cam tracks 129, the rollers 111 on the studs carried by the blocks 110 attached to the plates 109, to which the pins 108 are secured, engage the converging surfaces 129a and, as the movement of the holder continues, the rollers are forced inwardly so that the pins enter the body of the crab. Pins are so arranged that, when a crab body is placed on the holder as described, the pins will normally enter leg openings of the crab body.

A pair of L-shaped wedge plates 130 (FIG. 10) attached by means of their short legs 130a to the top of the cam tracks 129 and the long legs 130b extend downwardly and forwardly between the tracks 129. As the holders are advanced from beneath the chute 87, the rollers 106 on the arms 105 of the holders rest on the track 117 and the plates 102 of the holders lie approximately horizontal. As a holder approaches the ends of the long legs 130b on the wedge plates 130, the points of the carapace of a crab in the holder lie at a higher level than that of the ends of the legs 130b and, as the movement of the carriage continues, the points of the carapace pass over the ends of the legs. During the continued movement of the carriage, the points of the carapace slide up legs 130b and the carapace is lifted clear of the crab body and falls upon a plate 131 mounted on the framework 88 and extending at an angle between the upper and lower stretches of the chains 93 (FIG. 17).

The shaft 119 at the front end of the framework carries a group of brushes 132 with stiff bristles, which are preferably made of a suitable synthetic plastic material, such as nylon. As a holder approaches the brushes (FIG. 12), the roller 106 on the arm 105 attached to the plate 102 of the holder rides up on an elevated stretch 117a of the track 117 and, as a result, the plate is rocked to make an angle of about 60° to the horizontal with its rear edge up. In this position, the mouth parts MP of the crab body in the holder extend upwardly at the rear edge of the body and are in position to be struck and torn free by the brushes 132. The holder remains at the angle of 60° to the horizontal as the carriage passes beneath the second of the shafts 119, on which there are mounted a plurality of brushes 133 similar to the brushes 132. The brushes 133 complete the removal of the mouth parts from the body.

Beyond the second shaft 119, the cam track 117 curves downwardly to a level 117b (FIG. 13) below the tops of the chains 93 and, as a result, the arm 105 of a holder swings counter-clockwise and the plate 102 of the holder assumes a position at an angle of about 20° to 30° to the horizontal with its rear edge raised. The holder in this position passes beneath the third shaft 119 which carries a set of brushes 134 similar to the brushes 132. The brushes 134 remove the gills from the crab body.

Beyond the third shaft 119, a cross-bar 135 (FIG. 14) is mounted on upright members of the framework and, at its midpoint, carries a metal loop 136 in which a vertical bar 137 is held adjustably by a set screw 138. The lower end of the bar has the form of a hook pointed toward oncoming crabs in holders 101 on the chains 93 and an arm 140 is attached to the bar to overlie the hook. A lever 141 is pivoted on the arm near its free end and the lower end of the lever normally lies close to and above the end of the hook. The upper end of the lever is connected by a spring 142 to the bar above the arm and the spring normally holds the lever against a stop 140a on the arm.

The cam track 117 terminates just beyond the third shaft 119 and, when the roller 106 on the arm 105 of a holder runs off the end of the track, the plate of the holder is swung by gravity to a vertical position against the rear edges of the stop plates 114. In this position of the plate, the notch 102c is at the top. The bar 137 has been set in a position in the loop 136, in which the hook 139 lies in position to engage the apron in a crab body in a holder with its plate in vertical position, and, as the holder advances past the hook, the hook engages the apron and tears it loose. In this operation, the movement of the crab body past the hook swings the lever counter-clockwise against the resistance of the spring. When the apron has been detached from the crab body by the hook, the spring causes the lever to swing back quickly to its initial position against the stop 140a and this movement of the lever throws the detached apron free of the hook.

The fourth shaft 119 (FIG. 7b) carries a set of brushes 143 similar to the brushes 132 and the holders 101 (FIG. 15) continue in upright position beneath the brushes 143. The brushes clear away the debris resulting from the tearing loose of the apron and, as a carriage passes from beneath the brushes 143, its roller 106 engages the curved end 117c of a second section of the cam track 117 and the plate of the carriage is thereby swung back toward the horizontal.

Figure 13:
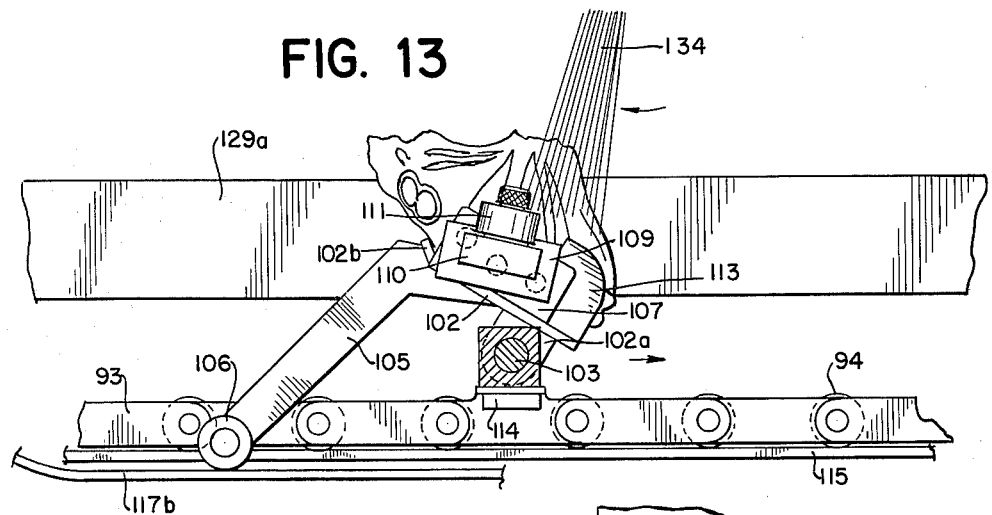
Figure 14:
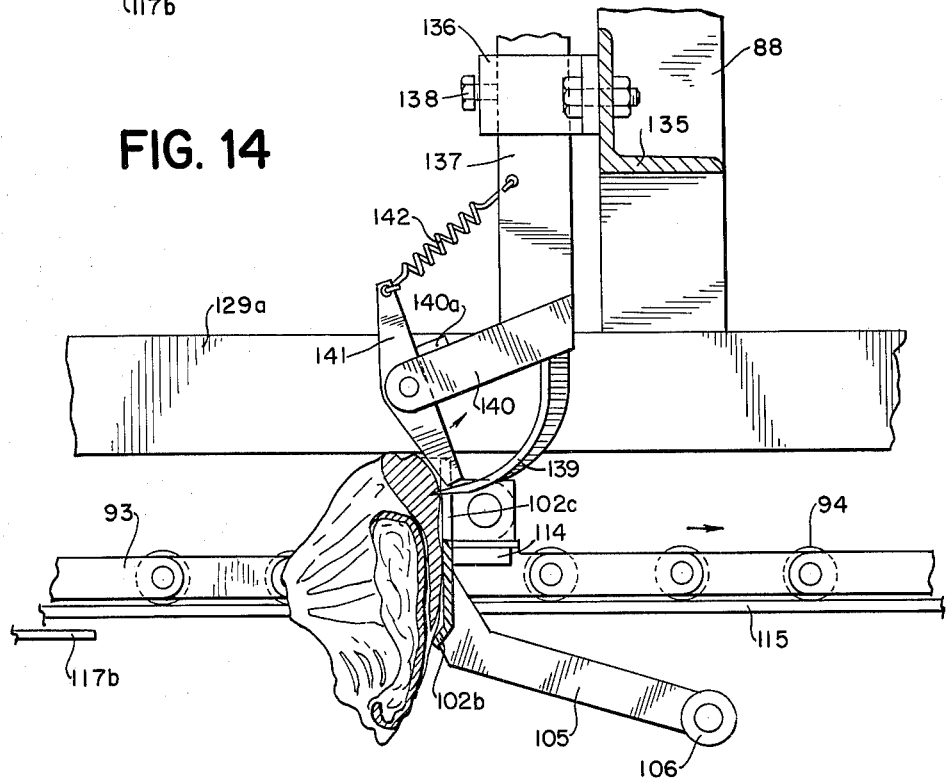

The fifth shaft 119 carries a set of brushes 144 and, as the holders pass beneath these brushes, the elevation of the cam track 117 is such that the plates of the holders are held at a low angle to the horizontal similar to that shown in FIG. 13. The brushes 144 remove the visceral matter from the crab bodies.

A pair of cam channels 145 (FIG. 16) are mounted on the ends of the cam tracks 129 and the inner walls 145a of the channels diverge in the direction of travel of the holders. When the rollers 111 of a holder enter and travel through the channels 145, the rollers are forced apart and this causes the pins 108 on the holder to be withdrawn from the crab body in the holder. As the holder travels over the sprocket wheels 92, the stripped crab body falls out of the holder and lands on a delivery chute 146.

In order to carry away waste material removed from the crab bodies within the enclosed portion of the framework 88 and collected upon the plate 131, a water pipe 147 (FIG. 17) with jet openings is mounted to extend along the upper edge of the plate and the material washed from the plate by the water is collected in a trough 148. The returning stretches of the chains pass between upper and lower water pipes 149, 150 having jet openings through which water and disinfectant are sprayed on the chains and the holders to clean and disinfect them. The water from the upper pipes falls upon the plate 131 and is collected in the trough 148 and flumed to plant refuse drains while the disinfectant from the lower pipe is collected in a pan 151 and is recirculated by a pump driven by a motor 152 (FIG. 7a) connected to the pipes 149 by piping 153. Water is also discharged upon the carriages in the holders on the upper stretches of the chains through a pipe 154 having controllable branches 155 directed downward along the line of travel of the crab bodies.

In the practice of the method of the invention by means of the apparatus described, the cooked crabs are held by engagement with their carapace and ventral surface between the sides thereof and the crabs are advanced along a straight path in one level with their legs and claws extending laterally During the tarvel of the crabs, their legs and claws are repeatedly flexed in planes transverse to the longitudinal axis of the crab by being struck by rotary beaters, which are preferably stiff brushes. The legs and claws thrust away from the carapace by the brush beaters tend to spring back but are struck by stiffer beaters acting in the same direction as the first beaters. The combined actions of the two kinds of beaters cause the legs and claws to be broken off at the knuckles and thrown clear.

The crabs are then next engaged at their sides below the points of the carapace and are advanced along a rectilinear path. The carapace on each body is engaged from beneath and freed from the body by wedging action as the body is advanced and this leaves the mouth parts accessible for easy detachment and exposes the gills and the visceral cavity. As the movement of the crab bodies continues, the mouth parts are broken off, the gills are removed, the apron is torn free from the body, the waste material exposed by removal of the apron is removed, and the visceral cavity is cleaned out. Except for the removal of the carapace and apron, the operations described are performed by rotating brushes while the removal of the carapace and apron is effected by stationary members. During the performance of the operations, the crab bodies are held at different angles in which the brushes and members operate most effectively. The carapace must be removed first but the mouth parts and gills can be removed in that order or vice versa, although it is preferable to remove the gills first. The removal of the apron then follows, after which the waste material exposed, when the apron is removed, and the visceral matter are removed.

When the operations described have been completed, the stripped carcasses are ready for treatment in accordance with the method of my Patent 2,858,223 and the preparation of the crab bodies for the purpose have involved no manual operations other than the placing of the crabs in the clamps and in the holders. The time consumed in the operations has, accordingly, been greatly reduced as has also the cost.

I claim:

1. a method of preparing crabs for the recovery of the meat therefrom, which comprises advancing a crab along a first path with the axis of its body extending in the direction of movement, breaking off the claws and legs from the crab by repeatedly striking them in a direction substantially transverse to the axis of the body to flex them relative to the body, thereafter engaging the sides of the body away from the carapace and advancing it along a second path, and, during its travel along the second path, freeing the carapace from the body, removing the gills, breaking off the mouth parts, detaching the apron from the body, clearing away waste material exposed by removal of the apron, removing the visceral material, and releasing the stripped body.

2. The method of claim 1, in which the crab body is held during its movement along the first path by pressure applied to central areas only of its ventral surface and of its carapace between the points thereof.

3. The method of claim 1, in which the crab is held with its carapace down during its movement along the first path and with its carapace up during its movement along the second path.

4. The method of claim 1, in which the crab is held substantially in a plane with its carapace down and its mouth end foremost during its movement along the first path, and, in the flexing of the legs and claws, they are repeatedly struck from beneath to raise them to a position at an angle to the carapace and repeatedly struck in the same direction after having been raised.

5. The method of claim 1, in which the crab is held substantially in a plane with its carapace up during its initial movement along the second path, and the crab is tilted about an axis transverse to its direction of movement to lie at an angle to the horizontal of at least 45° and with its apron end down before the mouth parts are detached from the body.

6. The method of claim 5, in which the crab is tilted about the axis to lie at an angle to the horizontal greater than 45° and with its apron end up before the apron is removed.

7. In a method of preparing crabs for the recovery of the meat therefrom, the steps of advancing a crab along a path with the axis of its body extending in the direction of movement and the legs and claws extending laterally, and repeatedly striking the legs and claws in a direction substantially transverse to the axis of the body to cause the legs and claws to be flexed relative to the body and broken loose from the body.

8. In a method of preparing crabs for the recovery of the meat therefrom, the steps of advancing a crab along a path while holding it with its carapace up and, during the advance of the crab, freeing the carapace from the body, removing the gills, breaking off the mouth parts, detaching the apron from the body, clearing away the waste material exposed by removal of the apron, and removing the visceral material, the crab being tilted to different positions about an axis transverse to the direction of its movement to facilitate subsequent operations.

9. The method of claim 8, in which the carapace is lifted from the body by a wedging action.

10. The method of claim 7, in which the crab is held with its carapace down during its movement and the legs and claws are struck from beneath.

11. The method of claim 7, in which the striking of the legs and claws is carried on at a plurality of places along the path.

12. The method of claim 7, in which the legs and claws are first struck from beneath to raise them above the horizontal and then struck with upward blows while in raised position.

13. In a method of preparing crabs for the recovery of the meat therefrom, the steps of piercing the sides of the body of each crab disposed with its carapace up, advancing the pierced crabs along a path with the axis of the body of each crab extending in the direction of movement, tilting each crab on a transverse horizontal axis to expose its apron, and removing the apron from the tilted crabs.

14. The method of claim 13, in which the apron is pried loose from each crab.

15. In a method of preparing crabs for the recovery of the meat therefrom, the steps of engaging the opposite sides of each crab at locations offset from the carapace to hold the crabs firmly, advancing the crabs along a path with the axis of the body of each crab extending in the direction of movement, and, during the advance of the crabs, tilting each crab about an axis transverse to the direction of movement to raise the mouth end of the crab, removing the mouth parts from the tilted crab, tilting each crab about such axis to raise the apron end of the crab, and removing the apron from the tilted crab.

References Cited by the Examiner
UNITED STATES PATENTS

| | | | |
|---|---|---|---|
| 2,522,578 | 9/1950 | Johnson | 17—45 |
| 2,716,776 | 9/1955 | Streich et al. | 17—2 |
| 2,784,447 | 3/1957 | Thompson et al. | 17—2 |
| 2,903,737 | 9/1959 | Ward | 17—45 |
| 3,151,351 | 10/1964 | Reinke | 17—2 |
| 3,156,946 | 11/1964 | Moncure | 17—2 |

SAMUEL KOREN, *Primary Examiner.*

LUCIE LAUDENSLAGER, *Examiner.*